United States Patent
Vollmer (10) Patent No.: US 9,896,093 B2
(45) Date of Patent: Feb. 20, 2018

(54) VEHICLE CONTROL SYSTEM

(71) Applicant: Atieva, Inc., Menlo Park, CA (US)

(72) Inventor: Axel Boris Vollmer, Sunnyvale, CA (US)

(73) Assignee: ATIEVA, INC., Menlo Park, CA (US)

( * ) Notice: Subject to any disclaimer, the term of this patent is extended or adjusted under 35 U.S.C. 154(b) by 57 days.

(21) Appl. No.: 14/854,748

(22) Filed: Sep. 15, 2015

(65) Prior Publication Data

US 2017/0072949 A1    Mar. 16, 2017

(51) Int. Cl.
| | |
|---|---|
| *B60W 30/085* | (2012.01) |
| *B60W 10/20* | (2006.01) |
| *B60W 10/184* | (2012.01) |
| *B60W 30/09* | (2012.01) |

(52) U.S. Cl.
CPC .......... *B60W 30/09* (2013.01); *B60W 10/184* (2013.01); *B60W 10/20* (2013.01); *B60W 30/085* (2013.01); *B60W 2400/00* (2013.01); *B60W 2520/10* (2013.01); *B60W 2550/10* (2013.01); *B60W 2600/00* (2013.01); *B60W 2710/18* (2013.01); *B60W 2710/20* (2013.01); *B60W 2900/00* (2013.01)

(58) Field of Classification Search
None
See application file for complete search history.

(56) References Cited

U.S. PATENT DOCUMENTS

| | | | | |
|---|---|---|---|---|
| 6,604,042 | B2 * | 8/2003 | Maruko | B60T 7/22 180/170 |
| 6,607,255 | B2 * | 8/2003 | Bond, III | B60T 7/22 303/193 |
| 7,109,854 | B2 * | 9/2006 | Dobler | G08G 1/166 340/435 |
| 7,881,865 | B2 * | 2/2011 | Ide | B60R 21/013 340/903 |
| 7,957,874 | B2 * | 7/2011 | Labuhn et al. | B60T 7/12 701/70 |
| 8,452,464 | B2 * | 5/2013 | Castaneda | B66F 9/0755 180/19.2 |

(Continued)

FOREIGN PATENT DOCUMENTS

| | | | | |
|---|---|---|---|---|
| WO | WO 2014051499 A1 * | 4/2014 | | B62D 15/0265 |
| WO | WO 2014058297 A1 * | 4/2014 | | B60T 7/042 |

*Primary Examiner* — Thomas G Black
*Assistant Examiner* — Demetra Smith-Stewart
(74) *Attorney, Agent, or Firm* — Patent Law Office of David G. Beck (57) ABSTRACT

A technique is provided in which detection of an impending collision results in the vehicle's control system taking steps to minimize damage to the passenger cabin, thereby increasing passenger safety. In particular, once an object is detected in the vehicle's pathway, the on-board controller determines whether or not a collision with the object (e.g., an on-coming car or a stationary object) is imminent. Once the system determines that a collision is imminent, the controller (i) deactivates the car's anti-lock braking system, (ii) locks-up the wheels, and (iii) rotates the front wheels to minimize intrusion of the wheels into the passenger cabin. The system may be configured to tailor the response to an imminent collision based on (i) vehicle speed, and (ii) probable impact area.

10 Claims, 6 Drawing Sheets

(56) References Cited

U.S. PATENT DOCUMENTS

2004/0055801 A1\* 3/2004 Kada .................... B62D 15/029
 180/167
2011/0060510 A1\* 3/2011 Barber .................... B60T 7/22
 701/70

\* cited by examiner

VEHICLE CONTROL SYSTEM

FIELD OF THE INVENTION

The present invention relates generally to vehicles and, more particularly, to a vehicle control system configured to minimize accident severity during a front impact collision.

BACKGROUND OF THE INVENTION

Vehicle safety has improved dramatically over the years. Initially many of the improvements were due to advances in the materials selected for various automobile components. For example safety glass, which was first introduced for use in cars in the 1920's, helped to reduce serious injuries and/or fatalities to the driver, passengers and bystanders that often resulted from the windshield or other vehicle windows being shattered in a car crash. Similarly, adding padding to the passenger compartment, most notably to the surfaces of the dashboard, helped minimize head injuries during sudden vehicle stops, especially those due to a collision. Two of the most significant safety advancements made to date, seat belts and air bags, have been estimated to have saved over 300,000 lives in the past 40 years.

In recent years vehicle designs have become increasingly sophisticated, yielding vehicles that are capable of protecting the vehicle's occupants from serious injury during a collision. In order to verify a vehicle's crashworthiness, vehicle manufacturers as well as third party testers (e.g., Insurance Institute for Highway Safety or IIHS; National Highway Traffic Safety Administration or NHTSA) subject cars to various tests that are designed to replicate a range of crash conditions. These tests include front and side impact tests plus roof strength tests, the latter type of testing designed to determine the risks of occupant injury during a vehicle rollover.

Two different types of frontal crash tests have been used recently to determine a vehicle's crashworthiness. In the first type of test, referred to as a moderate overlap test or simply as a frontal offset test, the test vehicle is driven into a roughly two foot tall barrier at 40 mph, the barrier having a deformable face made of an aluminum honeycomb. The barrier is located just off of the vehicle's centerline. The second type of test, referred to as a small overlap frontal test, is designed to replicate the effects of the front corner of the vehicle hitting another vehicle or an inanimate object such as a utility pole or tree. In this test 25% of the total width of the vehicle strikes a rigid, five foot tall barrier with the car traveling at 40 mph. This has been proven to be a difficult test since the safety cage in a typical car is designed to withstand head-on collisions and moderate overlap frontal crashes, not crashes that primarily affect the outer edge of the car. This area of impact is particularly difficult to design for because the affected front wheel is often forced rearward into the footwell during the crash. Accordingly, what is needed is a vehicle control system that minimizes accident severity, for example wheel intrusion into the occupant compartment during a small overlap collision. The present invention provides such a control system.

SUMMARY OF THE INVENTION

The present invention provides a method of automatically minimizing collision severity, the method including the steps of (a) monitoring at least one forward-looking sensor, where the at least one forward-looking sensor is vehicle mounted and configured to detect objects in the vehicle's pathway, and where the monitoring step is performed by an on-board controller coupled to the at least one forward-looking sensor; (b) detecting an object with the at least one forward-looking sensor; and (c) determining if a collision between the vehicle and the object is imminent, where the on-board controller performs the determining step, and where if the collision is imminent the method further comprises, (i) deactivating an anti-lock braking system (ABS) coupled to the vehicle's brake system, where the on-board controller performs the deactivating step, (ii) applying sufficient braking pressure to the brake system to lock-up the vehicle's wheels, where the on-board controller performs the applying step, and (iii) steering the vehicle's wheels using the vehicle steering system, where the controller performs the steering step after wheels are locked-up. The steering step may further comprise the step of rotating the vehicle's wheels towards the object or away from the object, and the vehicle's wheels may be rotated to the maximum extent allowed by the steering system.

In one aspect, if the collision is imminent the method may further comprise the steps of (A) determining an impact area corresponding to the predicted collision site between the vehicle and the object, where the on-board controller performs the step of determining the impact area prior to performing the deactivating step, and where the impact area is selected from a plurality of possible impact regions; and (B) comparing the impact area with a data set contained in memory coupled to the on-board controller, where the data set correlates the plurality of possible impact regions to a plurality of collision response instructions, where the data set associates a first subset of the plurality of possible impact regions with a first collision response instruction and associates a second subset of the plurality of possible impact regions with a second collision response instruction, where the first collision response instruction requires the on-board controller to perform steps (i), (ii) and (iii), and where the second collision response instruction requires the on-board controller to bypass steps (i), (ii) and (iii). The on-board controller preferably performs the step of determining the impact area using the at least one forward-looking sensor. The second collision response instruction may further require the on-board controller to initiate an emergency braking protocol. The second collision response instruction may further require the on-board controller to increase hydraulic pressure in the brake system.

In another aspect, if the collision is imminent the method may further comprise the steps of (A) determining the vehicle's speed; and (B) comparing the vehicle's speed to a preset speed prior to performing the deactivating step, where the on-board controller performs the step of comparing the vehicle's speed to the preset speed, where the on-board controller performs steps (i), (ii) and (iii) if the vehicle's speed is greater than the preset speed, and where the on-board controller bypass steps (i), (ii) and (iii) if the vehicle's speed is less than the preset speed. If the vehicle's speed is less than the preset speed, the method may further include the step of the on-board controller activating a warning indicator.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 1 provides a simplified view of a vehicle, viewed from above the car, along with a plurality of object detection zones associated with a variety of sensor types that may be used with the invention to detect objects that are potentially within the car's pathway.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

Modern vehicle control systems typically monitor ambient conditions in order to enable a variety of convenience features. For example, the vehicle's control system can be configured to vary windshield wiper speed based on rainfall, or alter the passenger cabin temperature and fan settings based on ambient temperature. Similarly, the control system can monitor exterior light conditions and use these conditions to control the exterior lighting as well as activate auto-dimming mirrors, cornering lights, and dash illumination. In addition to increasing driver and passenger comfort, by monitoring exterior conditions the control system can be configured to anticipate potential problems and provide rapid corrective action when necessary. For example, if it appears that the car is unintentionally veering from the current lane, the system can be configured to automatically steer the car back into its lane or, at a minimum, provide driver feedback by activating a warning indicator. In some instances, for example when the car starts to back over something or begins to enter into an intersection against on-coming traffic or approaches another car/stationary object at too high a rate of speed, the control system may be used to augment driver performance by automatically initiating braking or increasing hydraulic pressure in the brake system during a panic stop.

Figure 1:
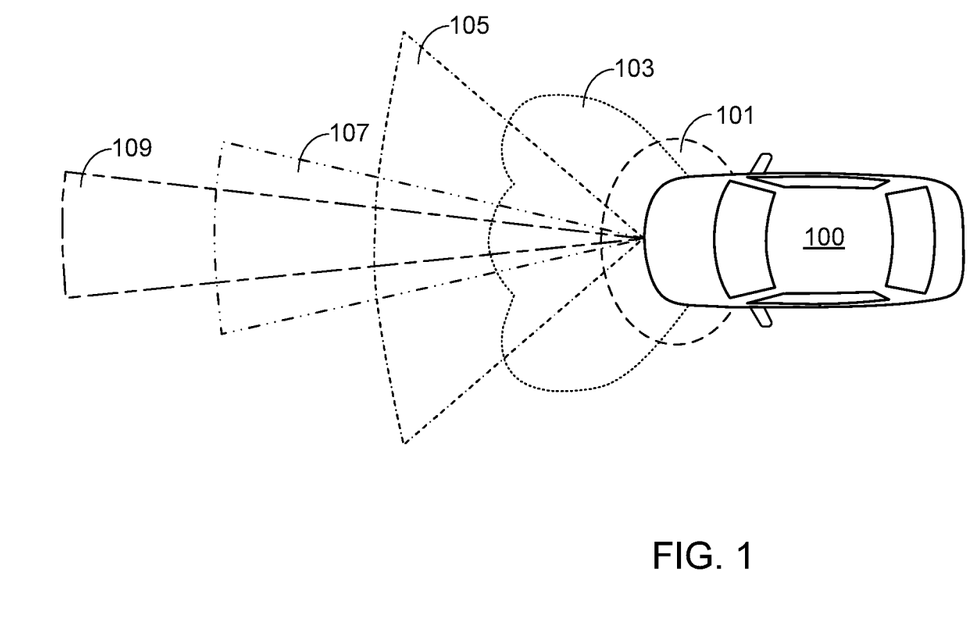

FIG. 1 provides a simplified view of a vehicle 100, viewed from above the car, along with a plurality of object detection zones that may be used with the invention to detect objects that are near the car as well as those that are potentially within the car's pathway. Although any of a variety of sensor types may be used to define these zones, typically each sensor is selected based on the desired detection range and, in some cases, the desired shape of the detection zone. Sensors that are often used in these applications include, but are not limited to, radar, electromagnetic, ultrasonic, LIDAR (i.e., light detection and ranging) and cameras. It will be appreciated that typically vehicle 100 also has detection zones extending from the side in order to monitor the car's blind spots during lane changes, and detection zones extending from the rear that may be used to detect cross traffic or objects that may not be visible to the driver when backing up. These side and rear detection zones, while not of particular use for the present invention, may also be used during vehicle parking.

Zone 101 extends only a short distance, generally on the order of a foot or two, from the front bumper of vehicle 100. This detection zone is primarily used during parking maneuvers as a means of alerting the driver of various obstacles (e.g., trees, other cars, buildings, etc.). The sensors that define zone 101, either electromagnetic or ultrasonic proximity sensors, are commonly integrated into the bumper. In a conventional vehicle when one of the sensors defining zone 101 detects an object, an audible or a visible warning is activated.

In some vehicles, a secondary zone 103 is provided in front of the vehicle. This zone, which extends away from the car for a further distance than that provided by zone 101, is used to detect cross traffic or objects that may not be visible to the driver. Zone 103 is often of critical importance when moving into traffic from a blind intersection, e.g., an intersection where buildings or other objects prevent the driver from adequately seeing traffic approaching from the left and/or the right. In general, when an object is detected in zone 105 when moving forward, an audible or visible warning is activated. Typically short or medium range radar detectors are used to define zone 103.

Zone 105 extends in front of car 100 as well as to either side, this zone providing lane departure warnings to the driver. Zone 105 uses a camera detection scheme along with image recognition software that is capable of detecting the lane markers that are typically used in multi-lane highways. When the system determines that the car is getting too close to either side of the present lane, a lane departure warning is activated. Generally the lane departure warning may be an indicator on the dash or an audible warning, although in some vehicles a tactile warning may be provided (e.g., a slight vibration in the steering wheel). It will be appreciated that the camera sensor system used with zone 105 may also monitor other roadside conditions, e.g., stop signs, school zone signs, etc.

Vehicle 100 may also include one or more long range zones, e.g., zones 107 and 109, which typically extend hundreds of feet in front of the car. The size and shape of these zones depends, at least in part, on the selected sensor, e.g., long range radar versus LIDAR. In some vehicles the long range zones may be used to control an adaptive cruise control system, i.e., a cruise control system that can automatically adjust vehicle speed in order to maintain a preset separation distance between a car and a vehicle directly in front of it. These zones may also be used for emergency braking systems that automatically brake the car, or augment the braking system, when the system determines that the car is likely to collide with a pedestrian or other object within its pathway.

Figure 2:
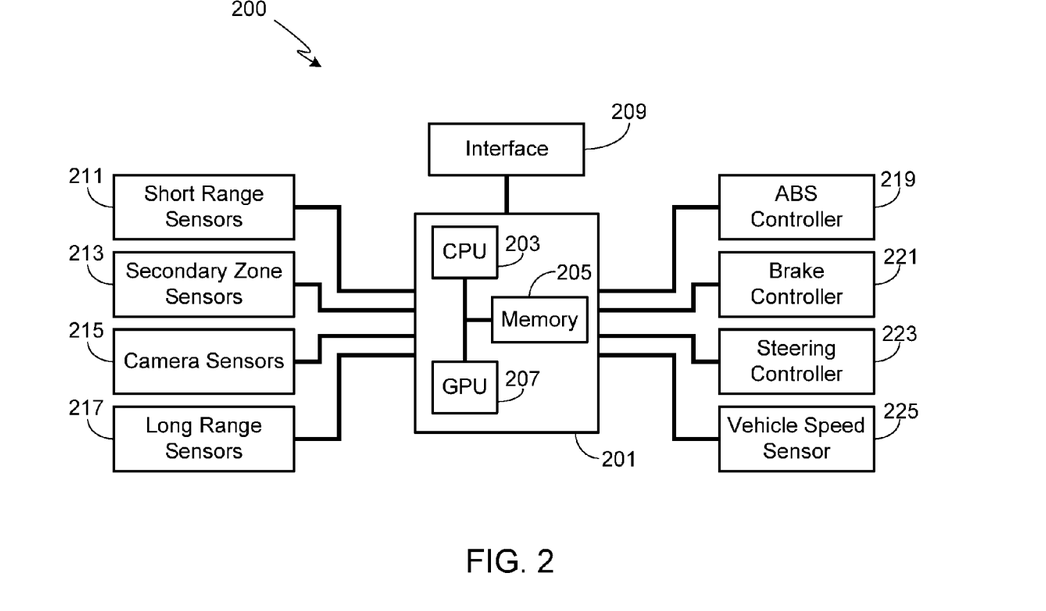
FIG. 2 provides a block diagram of the primary components utilized in the vehicle control system of the invention.

FIG. 2 provides a block diagram of a preferred embodiment of an exemplary vehicle control system 200 for use with the invention. It should be understood that vehicle control system 200 is but one possible configuration and that other configurations may be used while still retaining the functionality of the invention. Additionally, one or more of the elements shown in FIG. 2 can be grouped together in a single device, and/or circuit board, and/or integrated circuit.

Control system 200 includes a system controller 201 comprised of a central processing unit (CPU) 203 and a memory 205. Preferably controller 200 also serves as the vehicle's management system. Memory 205 may be comprised of EPROM, EEPROM, flash memory, RAM, a solid state disk drive, a hard disk drive, or any other memory type or combination of memory types. Depending upon the type(s) of display used in vehicle 100 as well as the capabilities of CPU 203, controller 201 may also include a graphical processing unit (GPU) 207. CPU 203 and GPU 207 may be separate or contained on a single chip set.

Although not required by the invention, typically an interface 209 is coupled to controller 201. Interface 209 allows the driver, or a passenger, to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or otherwise altering the functionality of vehicle 100. In at least some embodiments, interface 209 also includes means for the vehicle management system to provide information to the driver and/or passenger, information such as a navigation map or driving instructions as well as the operating performance of any of a variety of vehicle systems (e.g., battery pack charge level for an electric car, fuel level for the engine in a hybrid or ICE-based vehicle, selected gear, current entertainment system settings such as volume level and selected track information, external light settings, current vehicle speed, current HVAC settings such as cabin temperature and/or fan settings, etc.). Interface 209 may be comprised of a single interface, for example a touch-screen display, or a combination of user interfaces such as push-button switches, capacitive switches, slide or toggle switches, gauges, display screens, visible and/or audible warning indicators, etc.

As noted above, modern vehicles use a variety of forward-looking sensors to monitor the roadway in front of the car. For example, in the control system shown in FIG. 2 short range sensors 211 monitor zone 101, secondary zone sensors 213 monitor zone 103, camera sensors 215 monitor zone 105, and long range sensors 217 monitor zones 107 and 109. One or more of these sensors may be used by the car to provide (i) aid during parking maneuvers, (ii) aid when entering into cross-traffic, (iii) lane departure warnings, (iv) emergency braking, and (iv) separation distance control for adaptive cruise control systems. Additionally, and as described in detail below, some or all of these sensors may be used by the present invention to improve the vehicle's crashworthiness.

Figure 3:
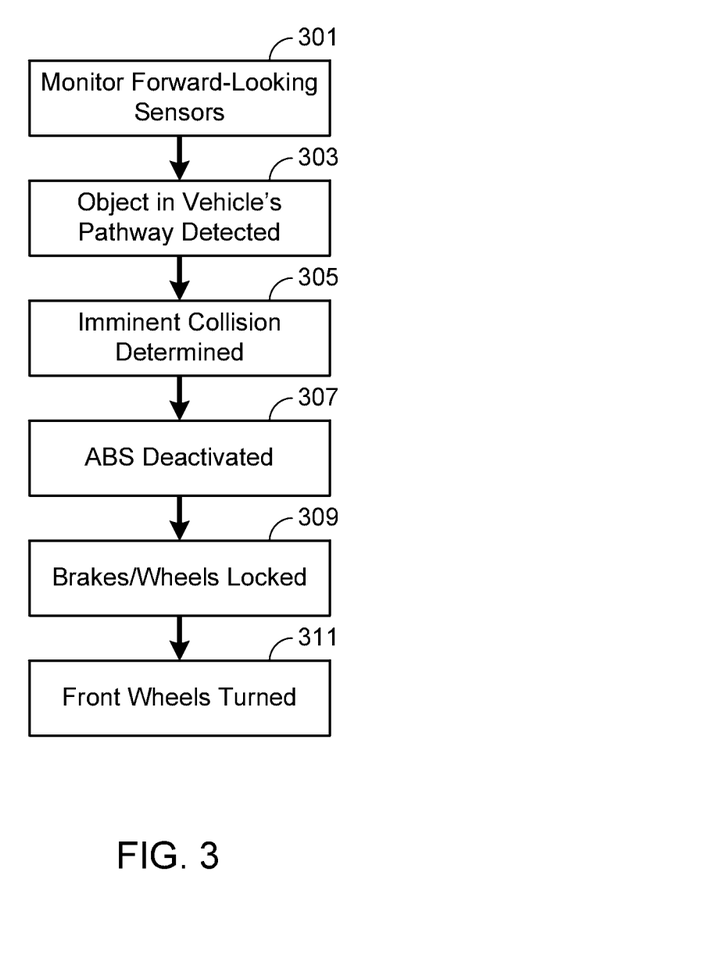
FIG. 3 illustrates the methodology associated with a preferred embodiment of the invention in which detection of an impending collision results in the vehicle's control system taking steps to minimize damage to the passenger cabin.

FIG. 3 illustrates the methodology associated with a preferred embodiment of the invention in which detection of an impending vehicle collision, e.g., a small overlap collision, results in the vehicle's control system taking steps to minimize damage to the passenger cabin, thereby increasing passenger safety. In accordance with the invention, initially controller 201 simply monitors the vehicle's various forward-looking sensors (step 301). Then, once an object is detected in the vehicle's pathway (step 303), the controller determines whether or not a collision with the object (e.g., an on-coming car or a stationary object) is imminent (step 305). In performing this step, controller 201 may utilize any of a variety of sensors as described above. For example, controller 201 may first detect a possible collision using a long or mid-ranged sensor (e.g., long range sensors 217 and/or camera sensors 215). Controller 201 may then use a short range sensor (e.g., sensors 211) and/or a secondary zone sensor (e.g., sensors 213) to determine that the car is about to crash. It should be understood that the method of the invention may be tailored to the types of sensors available on a particular vehicle. Therefore even if the car in question does not include sensors that monitor zones 107 and 109, mid and short range sensors may still be used to detect an imminent crash.

Once controller 201 determines that an unavoidable crash is imminent (step 305), controller 201 deactivates the car's anti-lock braking system (ABS) 219 (step 307) and then applies sufficient pressure to brake system 221 to lock-up the wheels (step 309). At the same time or immediately after locking up the wheels (step 309), controller 201 turns the front wheels (step 311) using steering system 223. Whether the wheels are turned towards or away from the object with which the car is about to collide depends in large part on the design of the car. Therefore in performing step 311, controller 201 is preferably pre-programmed to either turn the front wheels towards the object or away from the object.

In general, a vehicle's crashworthiness is improved if prior to impact the front wheels are turned sideways, and preferably turned sideways to the fullest extent allowed by the steering system. This is especially true if the vehicle is involved in an accident in which only the front corner of the vehicle directly strikes the other object (e.g., an on-coming car or a stationary object such as the corner of a building, a tree or a light post). In such a small overlap collision, if the wheels are not turned they are typically driven into the passenger cabin, resulting in more extensive occupant harm than might occur otherwise. Although whether the front wheels should be turned towards or away from the object depends on the specific design of the car in question (e.g., front vehicle structures, bumper assembly, placement of the wheels relative to the occupant crash structure and the rockers, etc.), typically turning the front wheels towards the object helps to remove the wheel from the car, and thus minimize its intrusion into the passenger cabin, while turning the front wheels away from the object tends to help spread the impact load by partially deflecting the force with the wheel rim.

It should be understood that an integral step in the present methodology is locking up the wheels (step 309). Furthermore, since the purpose of the ABS system is to prevent the wheels from locking, it is also critical that the ABS system be deactivated (step 307) prior to locking the wheels using brake system 221. By locking the wheels, the car will continue to skid in the same direction that it was traveling prior to the wheels being locked. Thus the intent of the present invention is not to minimize damage by steering the car away from the imminent collision, rather the intent is to minimize occupant harm by limiting damage to the passenger compartment via impact force deflection and/or minimization of front wheel intrusion into the passenger compartment. It will be appreciated that if the wheels are not locked prior to steering, the car will continue to track with the direction of the front wheels. While in some instances steering the car prior to impact could prove beneficial, it could also prove to be disastrous. For example, the car could be steered away from hitting a stationary object such as a sign post, and steered directly into another car traveling at a high rate of speed in the opposite direction. Thus in this example as a result of trying to actively avoid the collision, the outcome has become much worse with at least one additional vehicle becoming involved as well as at least one additional party (i.e., the driver of the additional car). Accordingly, the present invention is designed to maximize occupant safety without potentially involving other parties and/or causing additional personal or property damage.

Figure 4:
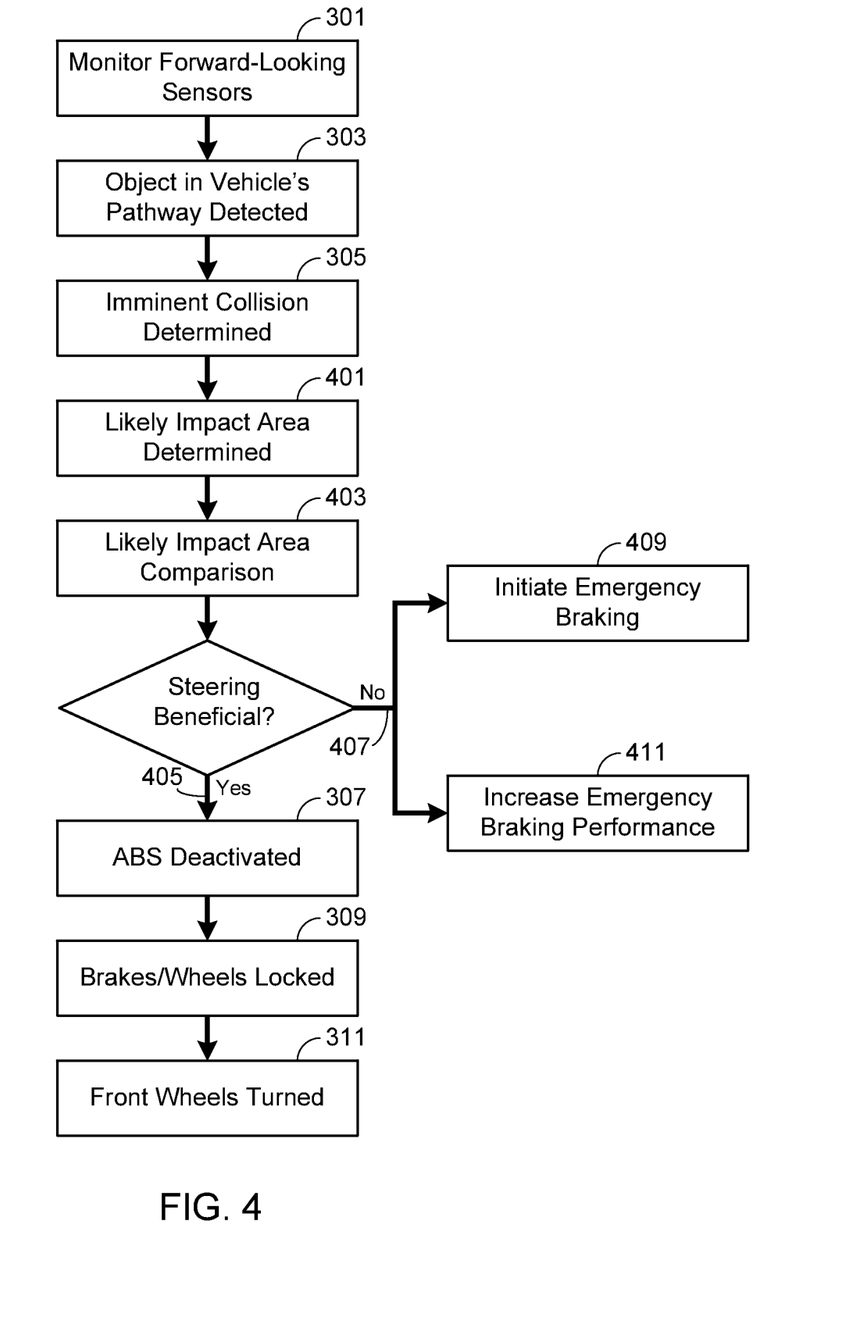
FIG. 4 illustrates the methodology associated with an alternate embodiment of the invention that is based on the embodiment shown in FIG. 3.

FIG. 4 illustrates the methodology associated with an alternate embodiment of the invention. In this embodiment, as with the previously described embodiment, the vehicle's controller monitors the forward-looking sensors (step 301), detects objects that are potentially in the vehicle's pathway (step 303), and determines when an imminent collision is likely (step 305). Once an imminent collision is detected (step 305), controller 201 then uses the forward-looking sensors to determine the likely area of impact (step 401). After the impact area has been determined, controller 201 determines whether the vehicle, and more importantly the vehicle's occupants, would fare better if the front wheels are locked (step 309) and turned (step 311). In some instances, for example a direct head-on collision, it may be better to apply the brakes with the ABS system still operational, thus slowing the car to the greatest extent possible prior to impact. Therefore in step 403, controller 201 compares the expected impact area with a table contained in memory 205. If, based on the results of this comparison, the car and its passengers would benefit from rotating the front wheels (step 405), then controller 201 deactivates the ABS system (step 307), locks the front wheels (step 309), and rotates the front wheels (step 311) as previously described. If on the other hand the car and its passengers are unlikely to benefit from rotating the front wheels (step 407), then controller 201 does not perform steps 307, 309 and 311. Although not required by the invention, preferably in this instance an emergency braking protocol is automatically initiated (step 409) or hydraulic pressure in the brake system is increased (step 411) in order to improve the panic stop capabilities of the car.

Figure 5:
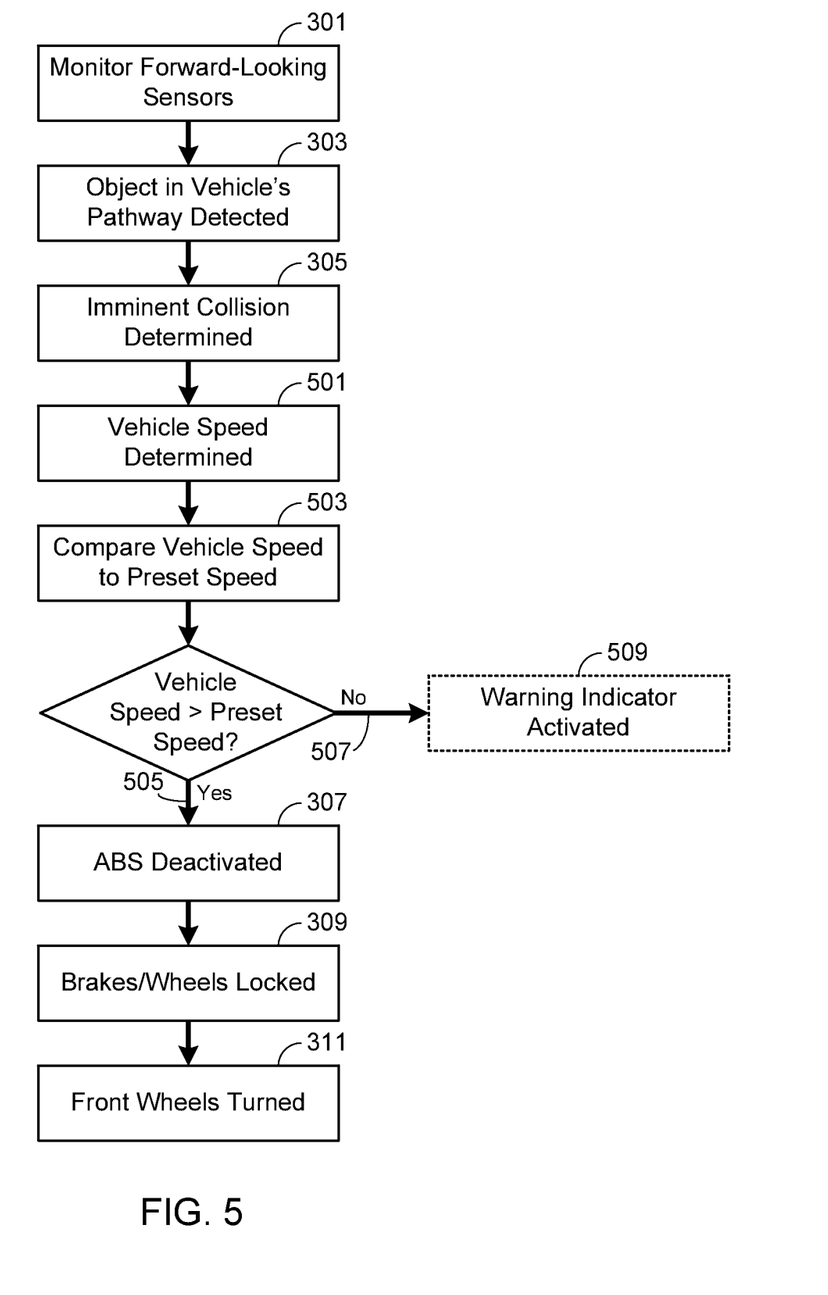
FIG. 5 illustrates the methodology associated with an alternate embodiment of the invention that is based on the embodiment shown in FIG. 3.

FIG. 5 illustrates the methodology associated with an alternate embodiment of the invention which is designed to insure that the car is traveling at a high enough speed to benefit from locking up the wheels and then rotating them. For example, if the car is moving too slowly, even with the ABS system turned off it may be difficult to lock-up the wheels. As previously noted, if the wheels are not locked then the car's direction of travel will be determined by the direction of the front wheels, possibly resulting in a more devastating outcome than would otherwise have occurred. Additionally, if the car is moving slowly, the driver may be able to easily avoid the collision by actively steering the car. In fact, in some instances the driver may intentionally direct their car at an object, for example while parking their car. In such a situation, the driver clearly intends to steer their car away from the object in their pathway and therefore it would obviously be problematic if the car were to automatically lock-up the wheels and alter the steering. Accordingly, in the embodiment illustrated in FIG. 5 after controller 201 detects an object potentially in the vehicle's pathway (step 303) and determines that an imminent collision is likely (step 305), the controller then uses speed sensor 225 to determine the vehicle's speed (step 501). Once the speed is determined, it is compared to a preset speed (step 503). If the vehicle's speed is greater than the preset speed (step 505), it is assumed that the car will hit the object. In this case controller 201 deactivates the ABS system (step 307), locks the front wheels (step 309), and rotates the front wheels (step 311) as previously described. If the vehicle's speed is less than the preset speed (step 507), controller 201 takes no further action. It will be appreciated that if the vehicle's speed is less than the preset speed (step 507), controller 201 may activate a standard warning (step 509), e.g., an audible and/or visible warning, such as the proximity warning indicator commonly used in many cars to warn the driver that the car is in close proximity to an object. As activation of a proximity warning indicator is optional, step 509 is shown in phantom.

Figure 6:
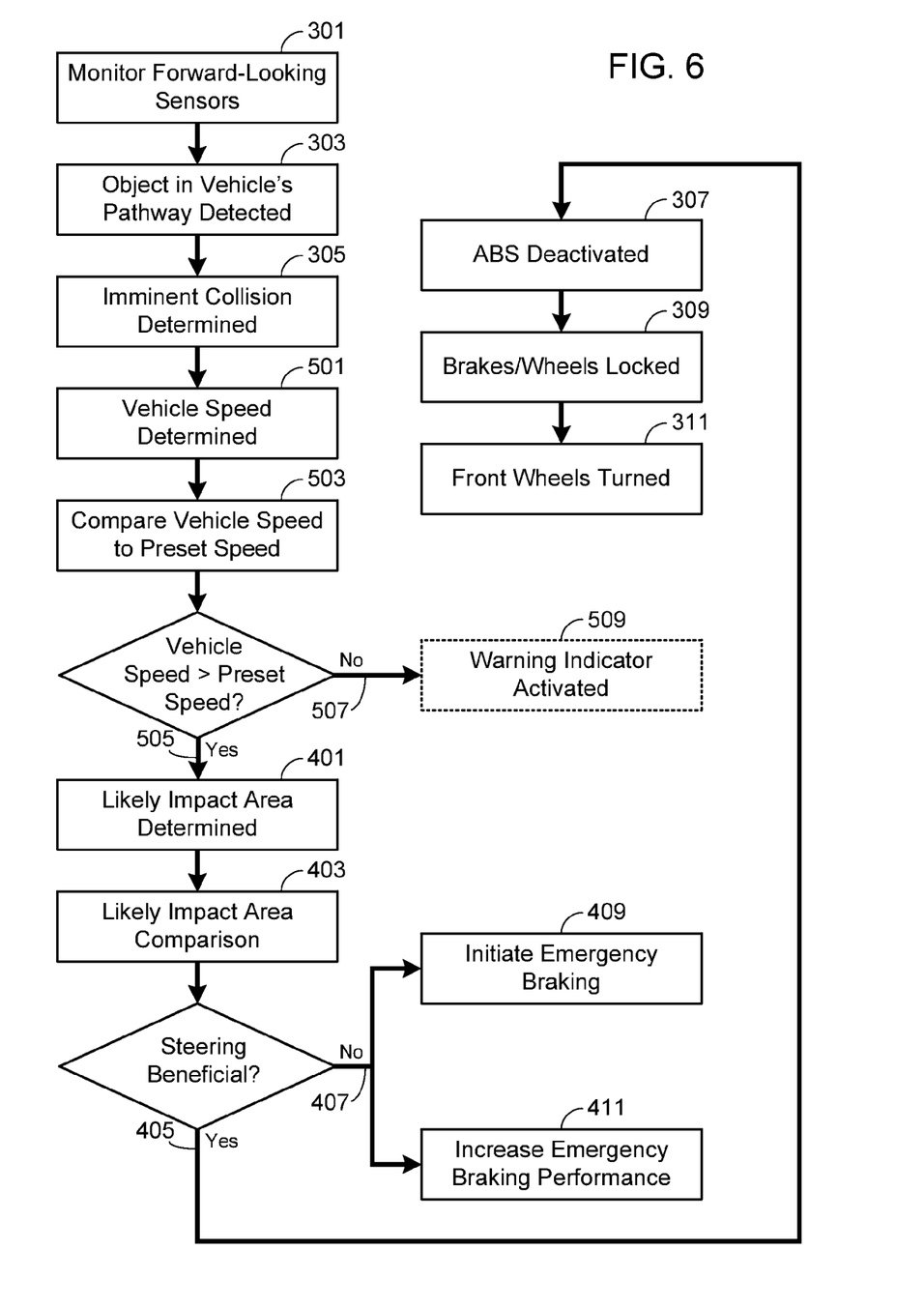
FIG. 6 illustrates the methodology associated with an alternate embodiment of the invention that is based on the embodiments shown in FIGS. 3-5.

In at least one embodiment, and as illustrated in FIG. 6, prior to deactivating the ABS system and locking up and steering the wheels, the controller verifies that the vehicle speed is greater than the preset speed as shown in FIG. 5 and that based on the expected impact zone it would be beneficial to lock-up and steer the front wheels as shown in FIG. 4. It should be understood that even though FIG. 6 shows the steps relating to vehicle speed occurring prior to those relating to impact area, these two groups of steps may be reversed in order. Additionally, the inventor envisions that in at least some embodiments of the invention the driver will be given the option of opting out, thus insuring that vehicle control is not lost during a critical driving maneuver. Deactivation of the system is preferably performed via interface 209 and a menu selection.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of automatically minimizing collision severity, the method comprising:
   monitoring at least one forward-looking sensor, wherein said at least one forward-looking sensor is mounted to a vehicle and configured to detect an object in a pathway of said vehicle, wherein said monitoring step is performed by an on-board controller coupled to said at least one forward-looking sensor;
   detecting said object with said at least one forward-looking sensor; and
   determining if a collision between said vehicle and said object is imminent, wherein said on-board controller performs said determining step, and wherein if said collision is imminent said method further comprises:
   (i) deactivating an anti-lock braking system (ABS) coupled to a brake system corresponding to said vehicle, wherein said on-board controller performs said deactivating step;
   (ii) applying sufficient braking pressure to said brake system to lock-up a set of vehicle wheels corresponding to said vehicle, wherein said on-board controller performs said applying step; and (iii) steering said set of vehicle wheels using a vehicle steering system, wherein said on-board controller performs said steering step after said set of vehicle wheels are locked-up.

2. The method of claim 1, wherein said step of steering said set of vehicle wheels further comprises the step of rotating said vehicle wheels to a maximum extent allowed by said vehicle steering system.

3. The method of claim 1, wherein said step of steering said set of vehicle wheels further comprises the step of rotating said vehicle wheels towards said object.

4. The method of claim 1, wherein said step of steering said set of vehicle wheels further comprises the step of rotating said vehicle wheels away from said object.

5. The method of claim 1, wherein if said collision is imminent said method further comprises:
  determining an impact area corresponding to a predicted collision site between said vehicle and said object, wherein said on-board controller performs said step of determining said impact area prior to performing said deactivating step, and wherein said impact area is selected from a plurality of possible impact regions; and
  comparing said impact area with a data set contained in a memory coupled to said on-board controller, wherein said data set correlates said plurality of possible impact regions to a plurality of collision response instructions, wherein said data set associates a first subset of said plurality of possible impact regions with a first collision response instruction and associates a second subset of said plurality of possible impact regions with a second collision response instruction, wherein said first collision response instruction requires said on-board controller to perform said steps (i), (ii) and (iii), and wherein said second collision response instruction requires said on-board controller to bypass said steps (i), (ii) and (iii).

6. The method of claim 5, wherein said on-board controller performs said step of determining said impact area using said at least one forward-looking sensor.

7. The method of claim 5, wherein said second collision response instruction further requires initiating an emergency braking protocol, wherein said on-board controller performs said step of initiating said emergency braking protocol.

8. The method of claim 5, wherein said second collision response instruction further requires increasing a hydraulic pressure in said brake system corresponding to said set of brakes, wherein said on-board controller performs said step of increasing said hydraulic pressure.

9. The method of claim 1, wherein if said collision is imminent said method further comprises:
  determining a speed corresponding to said vehicle; and
  comparing said speed to a preset speed prior to performing said deactivating step, wherein said on-board controller performs said step of comparing said speed to said preset speed, wherein said on-board controller performs said steps (i), (ii) and (iii) if said speed is greater than said preset speed, and wherein said on-board controller bypasses said steps (i), (ii) and (iii) if said speed is less than said preset speed.

10. The method of claim 9, wherein if said speed is less than said preset speed said method further comprises activating a warning indicator, wherein said on-board controller performs said step of activating said warning indicator.

\* \* \* \* \*